United States Patent [19]

Krein et al.

[11] Patent Number: 5,557,755

[45] Date of Patent: Sep. 17, 1996

[54] METHOD AND SYSTEM FOR IMPROVING BUS UTILIZATION EFFICIENCY

[75] Inventors: William T. Krein, San Jose; Charles M. Flaig, Cupertino; James D. Kelly, Aptos, all of Calif.

[73] Assignee: Apple Computer, Inc., Cupertino, Calif.

[21] Appl. No.: 201,461

[22] Filed: Feb. 24, 1994

[51] Int. Cl.$^6$ .............................. G06F 13/36; G06F 13/42
[52] U.S. Cl. ...................... 395/293; 395/729; 364/242.6; 364/242.92; 364/242.94; 364/242.96; 364/240; 364/DIG. 1
[58] Field of Search ...................................... 395/325, 725, 395/275, 293, 729, 200.05, 200.06, 285, 287; 340/825.5, 825.51; 370/85.2, 85.6

[56] References Cited

U.S. PATENT DOCUMENTS

| | | | |
|---|---|---|---|
| 4,191,998 | 3/1980 | Carmody | 395/550 |
| 4,320,467 | 3/1982 | Glass | 395/325 |
| 4,375,639 | 3/1983 | Johnson, Jr. | 340/825.5 |
| 4,470,114 | 9/1984 | Gerhold | 395/325 |
| 4,641,238 | 2/1987 | Kneib | 395/325 |
| 4,677,614 | 6/1987 | Circo | 370/85.15 |
| 5,111,424 | 5/1992 | Donaldson et al. | 395/725 |
| 5,193,193 | 3/1993 | Iyer | 395/725 |
| 5,257,385 | 10/1993 | Roskowski et al. | 395/725 |
| 5,263,163 | 11/1993 | Holt et al. | 395/725 |
| 5,263,172 | 11/1993 | Olnowich | 395/800 |
| 5,280,591 | 1/1994 | Garcia et al. | 395/325 |

*Primary Examiner*—Gopal C. Ray
*Attorney, Agent, or Firm*—Bobby K. Truong; Rajiv P. Patel

[57] ABSTRACT

In a bus system including a bus, a plurality of nodes including a primary node, and a bus access coordinator, bus utilization efficiency is improved by operating the coordinator at the same clock frequency as the primary node. The primary node is the node in the bus system which accesses the bus most frequently. By running the coordinator synchronous with the primary node, the need for synchronization events between the two components is eliminated. Since the primary node accesses the bus most frequently, eliminating synchronization events with the primary node eliminates most of the synchronization events in the bus system. Thus, synchronization events are minimized which, in turn, improves bus utilization efficiency.

10 Claims, 2 Drawing Sheets

METHOD AND SYSTEM FOR IMPROVING BUS UTILIZATION EFFICIENCY

FIELD OF THE INVENTION

This invention relates generally to computer systems and more particularly to a method and system for operating a bus access coordinator which improves bus utilization efficiency.

DESCRIPTION OF THE BACKGROUND ART

A typical computer system comprises a system bus, a plurality of nodes coupled to the bus, and a bus arbiter. A node may be a device which generates and receives signals, or it may be a port through which signals are transferred. The nodes communicate with each other by sending information signals on the system bus. Because a plurality of nodes are coupled to the same bus, a mechanism is needed to coordinate access to the bus by each of the nodes in order to prevent bus contention. This coordinating function is performed by the arbiter. The arbiter receives requests from the various nodes and responds by granting the bus to one of the nodes in accordance with some arbitration protocol. Only one node is granted the bus at any one time. By controlling access to the bus by each of the nodes, the bus arbiter ensures that bus contention does not result.

Like most if not all of the components in a typical computer system, a bus arbiter is a digital device. This means that the arbiter requires a clock signal to function. In typical computer systems, the arbiter operates using its own separate clock signal source. There is typically no correlation between this arbiter clock signal and any of the clock signals used to run any of the nodes. Because of this lack of correlation, at least two synchronization events must take place each time a node gains access to the bus. First, when the node submits its request to the arbiter, this request needs to be synchronized with the arbiter clock before the request can be processed. Second, when the arbiter sends a bus grant signal to the node to grant the node the bus, the bus grant signal needs to be synchronized with the clock signal used by the node before the node can process the signal. While such a system functions properly, it is inefficient because each synchronization event costs valuable bus time and hardware and decreases the usable bandwidth of the bus. A system which minimizes synchronization events and increases bus utilization efficiency would be more desirable.

SUMMARY OF THE INVENTION

In accordance with the present invention, a bus system is provided comprising a bus, at least one node coupled to the bus, and a bus access coordinator coupled to the node. The node uses the bus to send information signals, and the coordinator controls access to the bus by the node to prevent bus contention. The present invention is partially based on the observation that synchronization events between two components may be minimized if the components are operated using the same clock signal. In accordance with this observation, the bus coordinator of the present invention preferably operates under the same clock signal as that used by a primary node. According to the method of the invention, a primary node is first designated. This primary node preferably is the node in the bus system which accesses the bus most frequently. After the primary node is designated, an operating clock signal is derived from the primary node. This operating clock signal is preferably the same clock signal used to run the primary node. Thereafter, the operating clock signal is applied to the coordinator to operate the coordinator at the same clock frequency as the primary node. By running the coordinator at the same frequency as the primary node, the need for synchronization events between the two components is eliminated. Since the primary node is the node which accesses the bus most frequently, eliminating synchronization events with the primary node eliminates most of the synchronization events in the bus system. Hence, bus utilization efficiency is improved.

DETAILED DESCRIPTION OF THE PREFERRED EMBODIMENTS

Figure 1:
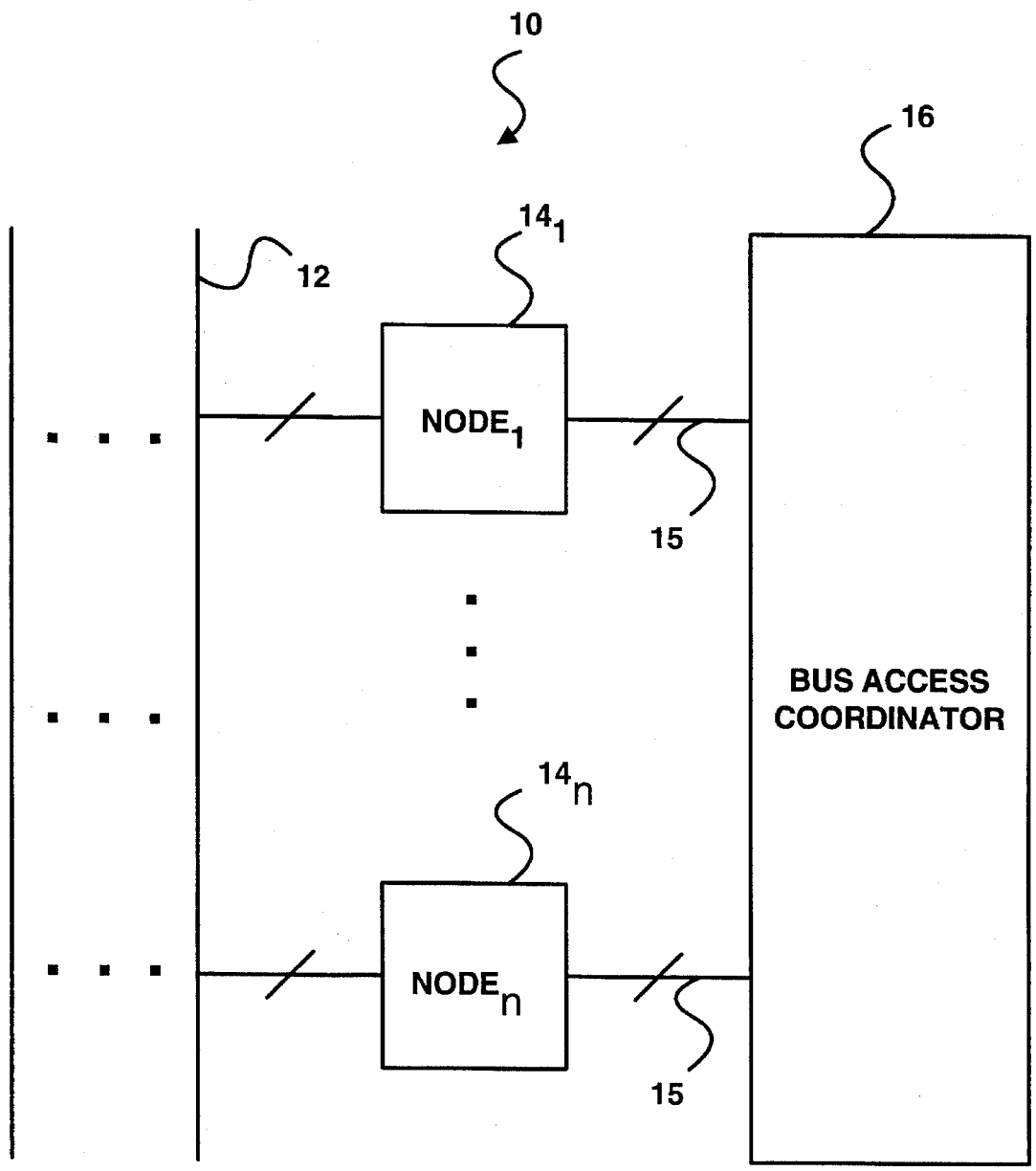
FIG. 1 is a block diagram representation of the system of the present invention.

With reference to FIG. 1, there is shown a block diagram representation of the system 10 of the present invention, wherein the system 10 preferably comprises a bus 12, a plurality of nodes $14_1$–$14_n$ coupled to the bus 12, and a bus access coordinator 16 coupled to the nodes 14. A node may represent either a device or a port, and may send signals onto the bus 12, receive signals from the bus 12, or both. As an example, in a personal computer system, a node may be a motherboard, a video or sound card, a parallel or serial port, a modem, or some other device or port. Each node 14 is preferably coupled to the bus 12 to send and receive signals therefrom. Because a plurality of nodes are coupled to the same bus, there is potential for conflict among the nodes 14 for access to the bus 12, which would lead to bus and signal contention. To forestall the possibility for conflict, bus access coordinator 16 coordinates access to the bus 12 by each of the nodes 14.

Coordinator 16 performs its function by first receiving bus request signals from each node needing access to the bus 12. These request signals are preferably received on lines 15. The coordinator 16 then arbitrates the various requests in accordance with an arbitration protocol to determine which requesting node should be granted the bus 12. The arbitration protocol preferably implements a round-robin fairness scheme. However, if other schemes are desired, they may also be implemented without departing from the spirit of the invention. After a node is selected, coordinator 16 sends a bus grant signal, via lines 15, to the selected node to grant the node control of the bus 12. Once the selected node receives the bus grant signal, the node sends a set of information signals onto the bus 12. When signal transmission is complete, the selected node notifies the coordinator 16 that it no longer needs the bus 12, and in response, the coordinator 16 deactivates the bus grant signal to take control of the bus 12 away from the node. Thereafter, coordinator 16 repeats the process described above to once again receive bus request signals and to grant control of the bus 12 to another (or perhaps the same) node. Accessing of the bus 12 by the nodes is thus controlled by coordinator 16.

Like most if not all of the nodes 14 in system 10, coordinator 16 is a digital device and, as such, requires a clock signal to operate. In typical prior art bus systems, the arbitrator operates in response to a separate and independent clock signal. That is, the arbitrator clock signal typically has no correlation to any clock signal used by any of the nodes in the bus system. In the system of the present invention, however, coordinator 16 preferably operates in response to the same clock signal as that used by the node which accesses the bus 12 most frequently, i.e. the primary node. This serves to minimize the synchronization events needed in the bus request/grant process which, in turn, improves bus utilization efficiency.

To elaborate on this point, it was noted above that in typical bus systems, the arbitrator clock signal has no correlation with any clock signal used by any of the nodes in the system. This lack of clock signal correlation causes synchronization events to be introduced into the bus request/grant process. To illustrate, it is a general rule that signals need to be synchronous with the logic acting on the signals. This means that the bus request signals from the nodes need to be synchronous with the arbitrator logic before the arbiter can process the signals, and that the bus grant signal from the arbiter needs to be synchronous with the logic of the selected node before the node can process the bus grant signal. If the nodes and the arbiter operate in response to separate and independent clock signals, however, the signals and the logic components receiving the signals will not be synchronous. In order to operate properly, the signals and components need to be synchronized. Specifically, the bus request signals need to be synchronized with the arbiter, and the bus grant signal needs to be synchronized with the selected node. This means that, for each bus request and grant, two synchronization events are introduced. Each event costs time and decreases the usable bandwidth of the bus.

Figure 2:
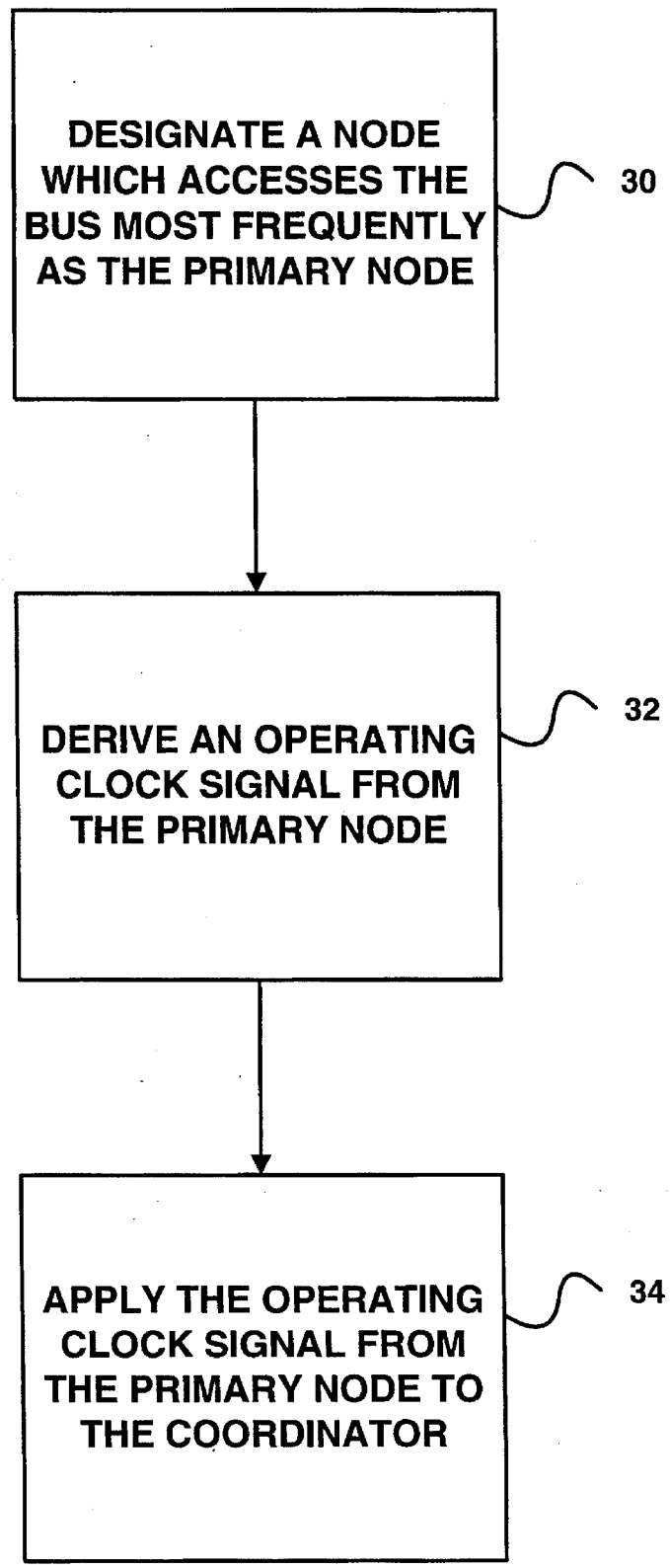
FIG. 2 is a flow diagram of the method of the present invention.

The method of the present invention improves bus utilization efficiency by eliminating or at least reducing the number of synchronization events involved in the bus request/grant process. With reference to the flow diagram provided in FIG. 2, bus utilization efficiency may be improved by first designating 30 one of the nodes 14 in the system 10 as a primary node. The primary node is preferably the node in system 10 which accesses bus 12 most often. As an example, the primary node in a typical personal computer is probably the motherboard since it is the motherboard which sends a majority of the signals transferred on the bus. In other systems, the primary node may be another component or port. After the primary node is designated, an operating clock signal is preferably derived 32 therefrom. This operating clock signal is preferably the same clock signal used by the primary node for its own operations. Thereafter, the operating clock signal is applied 34 to the coordinator 16 to operate the coordinator 16 at the same clock frequency as the primary node.

Operating the coordinator 16 in this manner significantly improves bus utilization efficiency. Because the primary node now operates at the same frequency as the coordinator 16, there is no need to synchronize either the bus request signal to the coordinator 16 or the bus grant signal from the coordinator 16. Synchronization is guaranteed. Since the primary node is the node which requests and is granted the bus 12 most often, eliminating synchronization events with the primary node eliminates most of the synchronization events in the bus system 10. This, in turn, reduces bus bandwidth waste and improves bus utilization efficiency. Synchronization events in the bus request/grant process may be eliminated altogether if all of the nodes 14 in the bus system 10 are operated in response to the same clock signal. While such an implementation is usually not practicable due to system considerations, it is within the scope of the present invention. This and other modifications are within the spirit of the present invention.

What is claimed is:

1. In a system comprising a bus, a plurality of nodes, each node receiving a clock signal, the nodes coupled to the bus, and a bus coordinator coupled to the nodes for coordinating access to the bus by the nodes, a method for operating the system, comprising the steps of:

determining which node accesses the bus most frequently;

designating from one of the plurality of nodes a primary node as the node in the system that accesses the bus most frequently, the primary node receiving the clock signal for the primary node;

deriving an operating clock signal from the clock signal received by the primary node;

operating the primary node in response to the operating clock signal; and applying the operating clock signal to the bus coordinator to operate the bus coordinator at the same clock signal as the primary node, thereby ensuring synchronous operation between the primary node and the bus coordinator, each other node operating in response to the clock signal received by that node.

2. The method of the system in claim 1, wherein the determining step further comprises the step of implementing an arbitration protocol based on a round-robin fairness scheme.

3. A bus system, comprising:

a bus;

a plurality of nodes, each node receiving a clock signal, coupled to the bus, one of the plurality of nodes being a primary node designated as the node that is determined to access the bus most frequently, the primary node deriving an operating clock signal from the clock signal received by the primary node and operating in response to the operating clock signal; and a bus coordinator coupled to the nodes for coordinating access to the bus by the nodes, the bus coordinator receiving the operating clock signal and operating in response to the operating clock signal, ensuring synchronous operation between the primary node and the bus coordinator, each other node operating in response to the clock signal received by that node.

4. The bus system in claim 3, wherein the primary node is a computer system board.

5. The bus system in claim 3, wherein the primary node is a computer data port.

6. The bus system in claim 3, wherein the primary node is a computer peripheral component.

7. The bus system in claim 3, wherein the operating clock signal is the same as the clock signal received by the primary node.

8. The bus system in claim 3, wherein the bus coordinator system selects the primary node from the plurality of nodes.

9. In a bus coordinator system comprising a bus, a plurality of nodes coupled to the bus, each node receiving a clock signal, and a bus coordinator coupled to the nodes for coordinating access to the bus by the nodes, a method for operating the bus coordinator system comprising the steps of:

receiving at the bus coordinator a bus request signal from each node requiring bus access;

determining which node accesses the bus most frequently;

selecting one bus request signal of a node determined to access the bus most frequently;

designating the node of the selected bus request signal as a primary node;

sending a bus grant signal from the bus coordinator to the primary node;

deriving an operating clock signal from the clock signal received by the primary node;

operating the primary node in response to the operating clock signal, each other node functioning in response to the clock signal received by that node; and applying the operating clock signal to the bus coordinator to operate the bus coordinator.

10. The method of operating the bus coordinator system in claim 9, wherein the determining step further comprises the step of implementing an arbitration protocol based on a round-robin fairness scheme.

* * * * *